Dec. 8, 1964  K. C. BUGG  3,160,031
PLANETARY FRICTIONAL DRIVE MECHANISM
Filed May 1, 1961  7 Sheets-Sheet 1
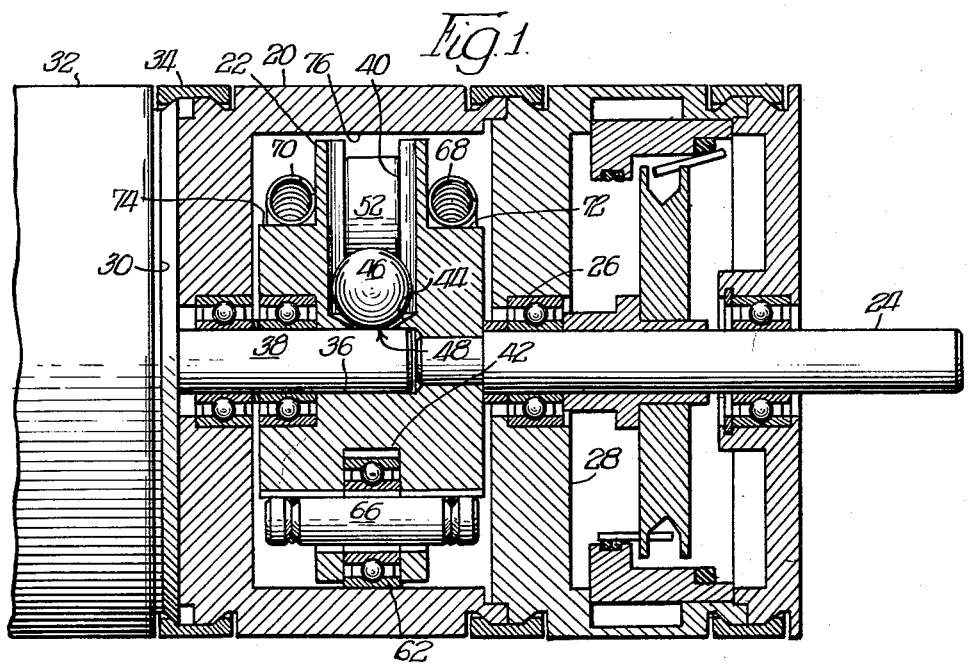
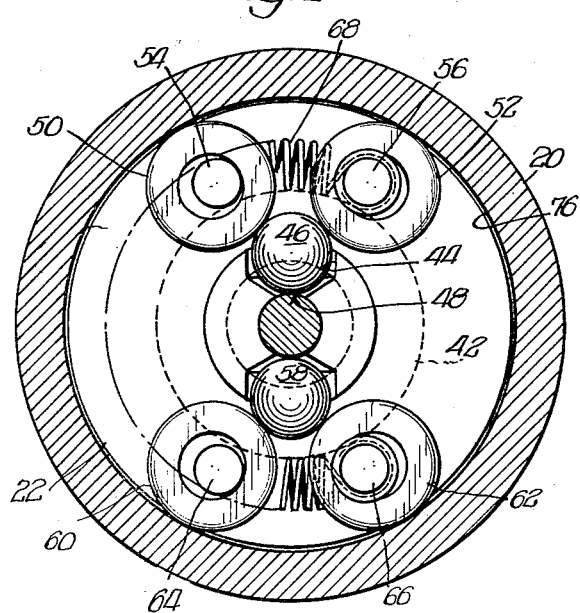
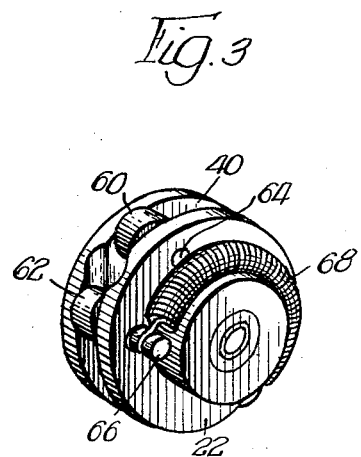
INVENTOR.
Henry C. Bugg,
BY
Byron, Hume, Grosn + Clement
Attys.

Dec. 8, 1964  K. C. BUGG  3,160,031
PLANETARY FRICTIONAL DRIVE MECHANISM
Filed May 1, 1961  7 Sheets-Sheet 2
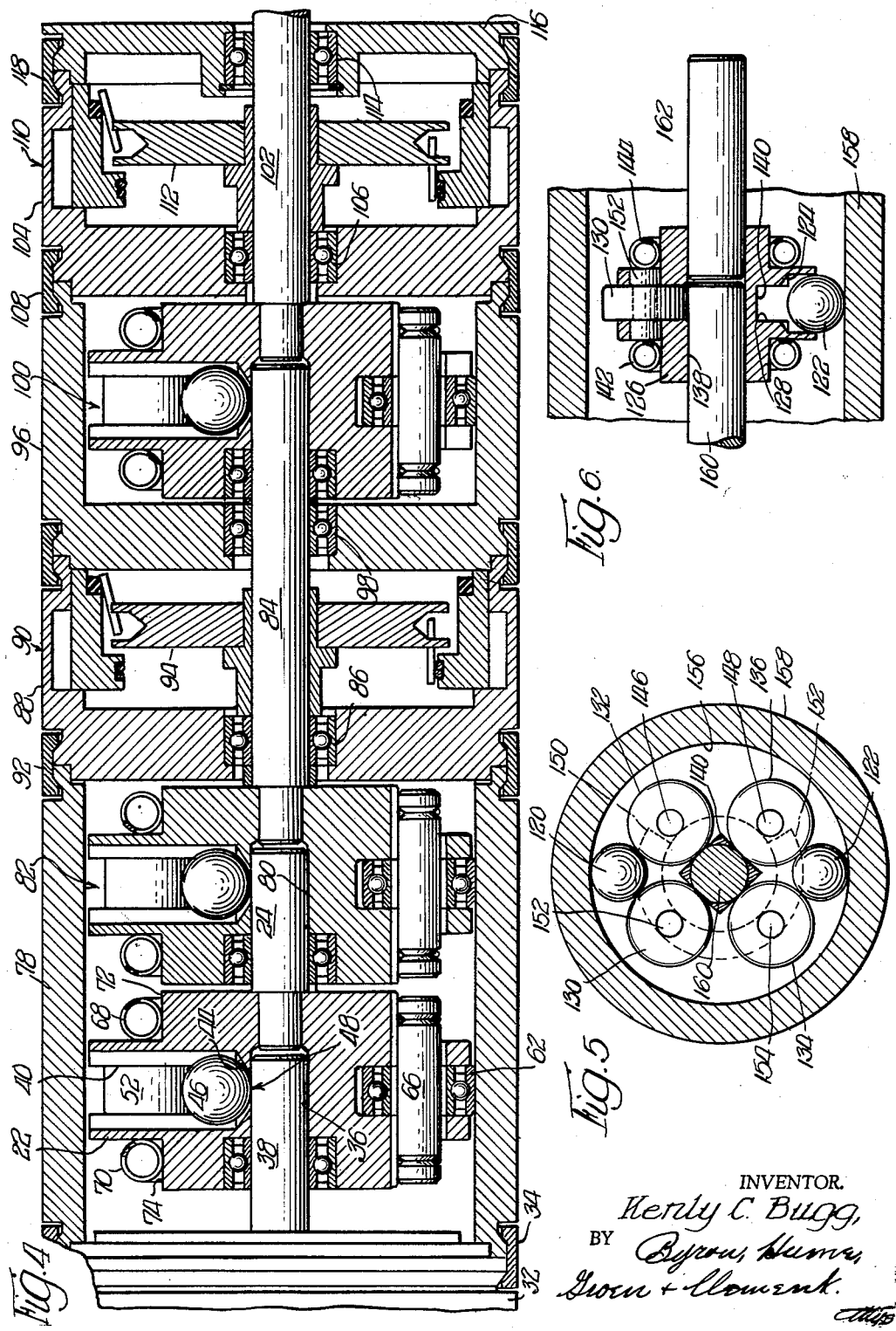
INVENTOR.
Kenly C. Bugg,
BY

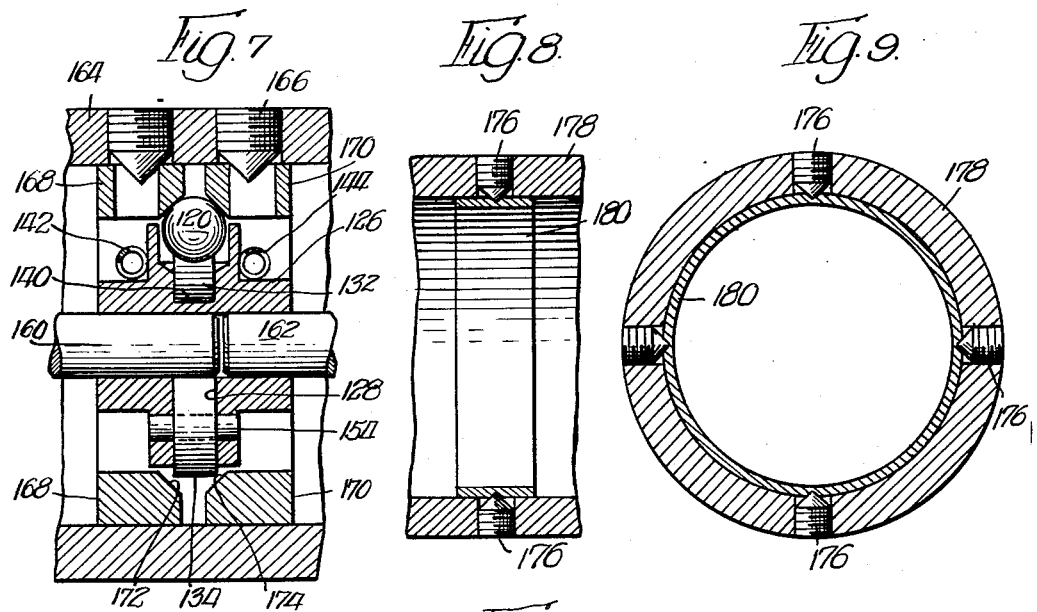
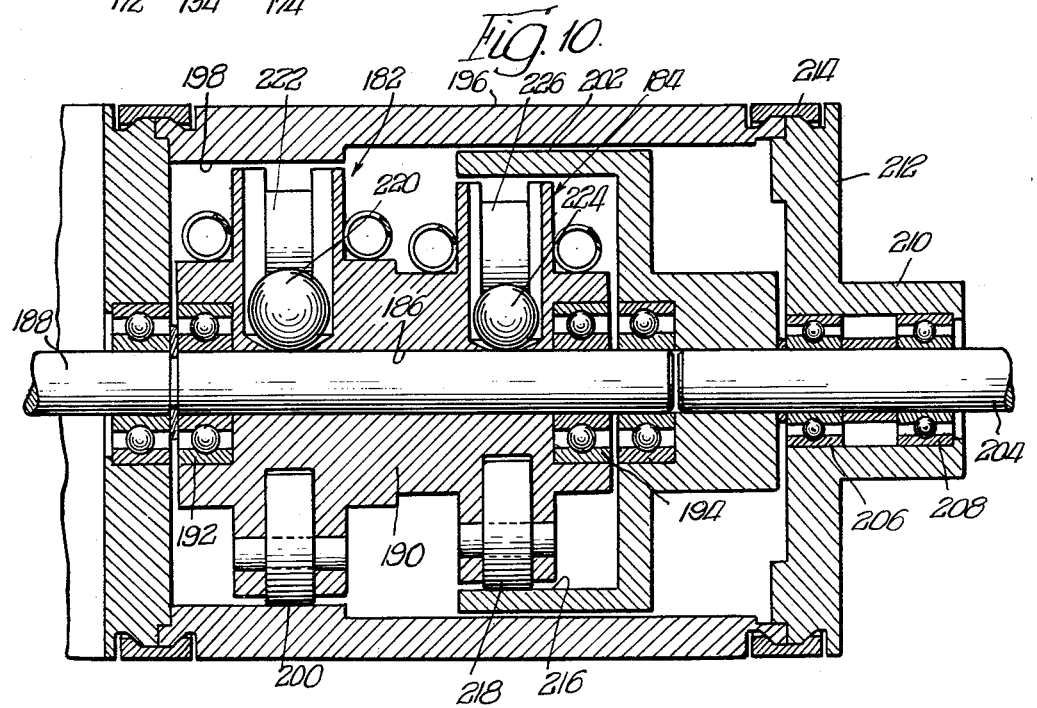

Dec. 8, 1964      K. C. BUGG      3,160,031
PLANETARY FRICTIONAL DRIVE MECHANISM
Filed May 1, 1961      7 Sheets-Sheet 4

INVENTOR.
Kenly C. Bugg,
BY
Byron, Hume, Groen + Clement
ATTYS.

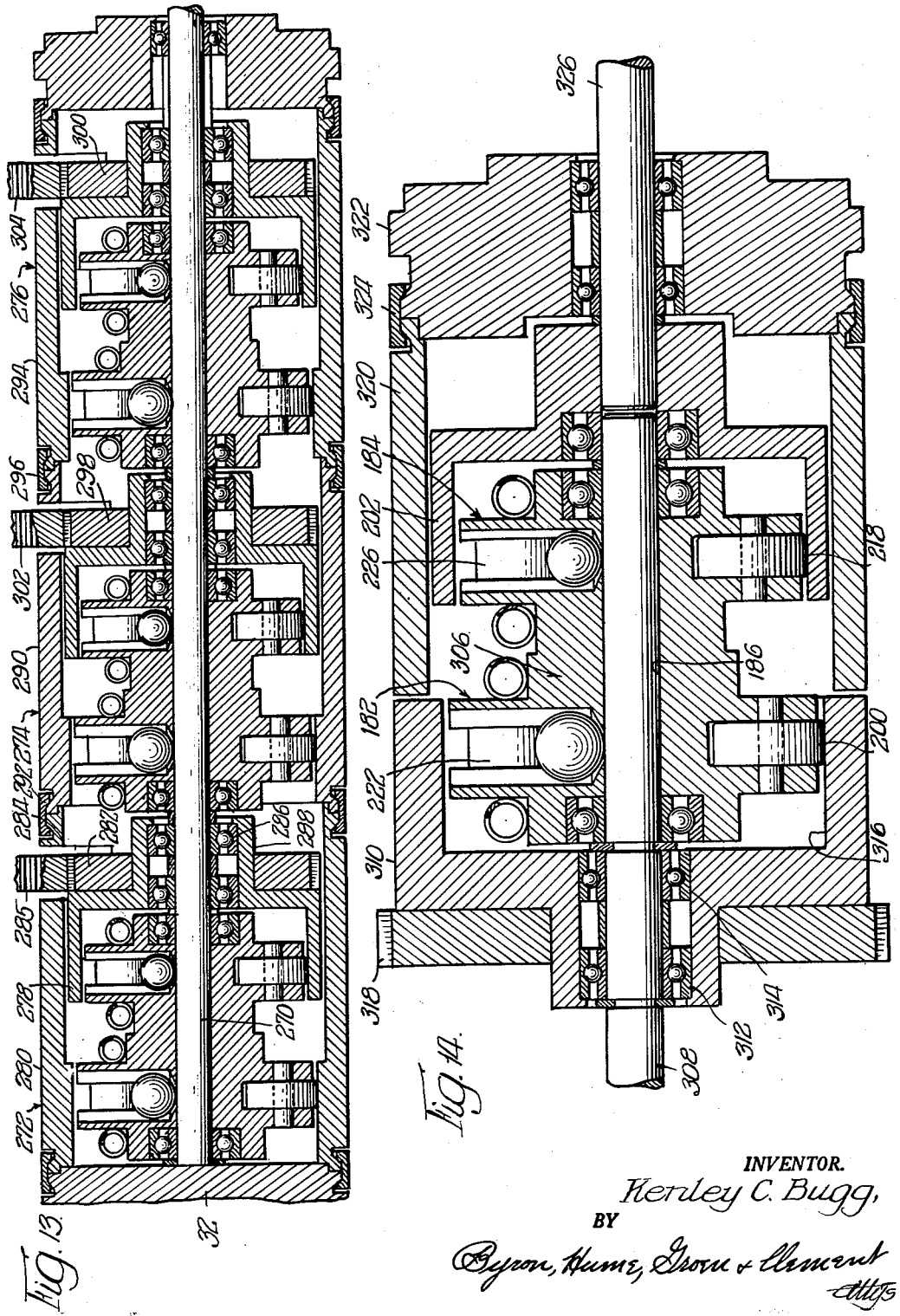

Dec. 8, 1964 K. C. BUGG 3,160,031
PLANETARY FRICTIONAL DRIVE MECHANISM
Filed May 1, 1961 7 Sheets-Sheet 6

INVENTOR.
Kenly C. Bugg,
BY
Byron, Hume, Groen + Clement
Attys

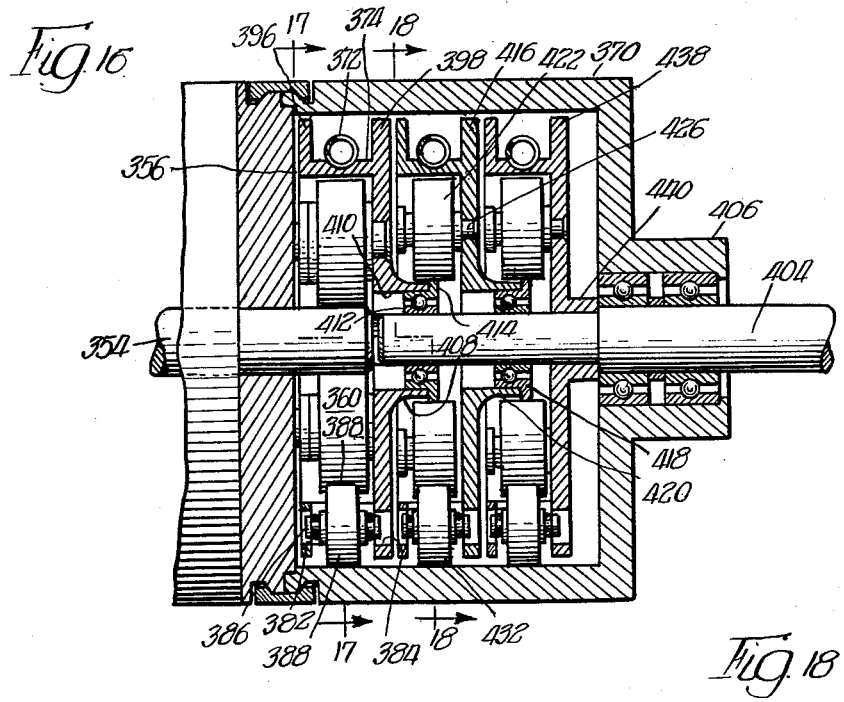
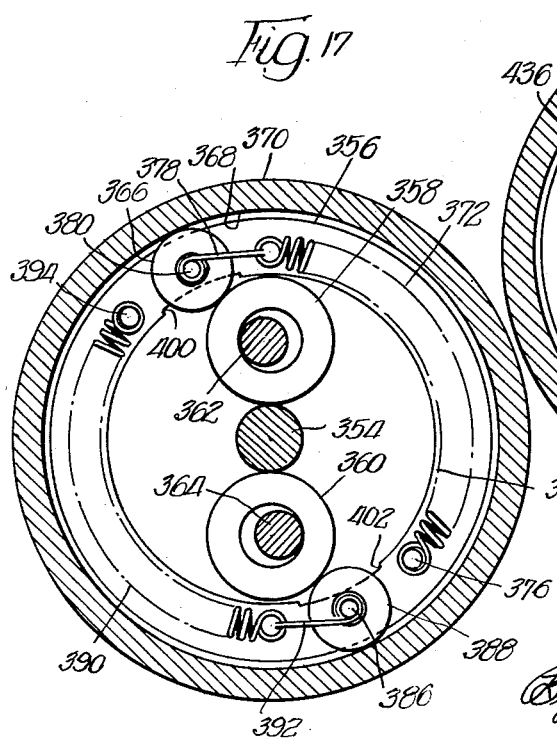
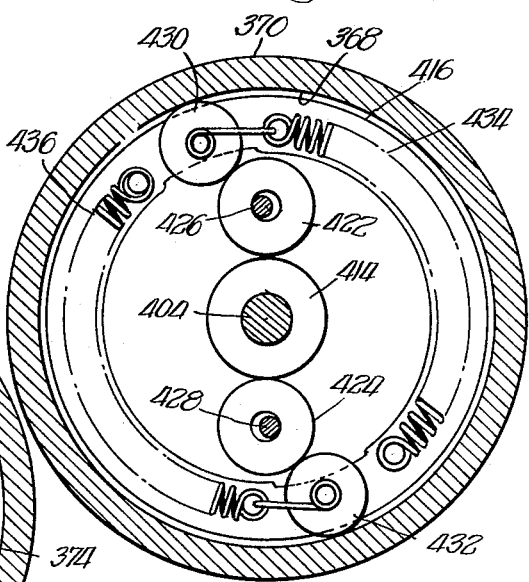

United States Patent Office 3,160,031
Patented Dec. 8, 1964

3,160,031
PLANETARY FRICTIONAL DRIVE MECHANISM
Kenly C. Bugg, Fort Wayne, Ind., assignor to Kendick Manufacturing Company, Inc., Fort Wayne, Ind., a corporation of Indiana
Filed May 1, 1961, Ser. No. 106,862
24 Claims. (Cl. 74—798)

This invention relates to a planetary frictional drive and more particularly to a drive which is adapted for use as a speed reducer or a differential drive, or a combination of the two.

Electromechanical control systems have achieved a high degree of development and their use in computers, space vehicles and similar installations has created a demand for highly accurate and reliable drive mechanisms. When used in servomechanisms, especially those employing rotary signal transducers, it is necessary to reduce the sources of error to a minimum to establish precise control. Common sources of error in such devices are backlash, resiliency, inertia and wear. Obviously, too, the device must be as free from undesirable friction as possible.

The need for precision miniature components in such control systems is particularly great with the emphasis on space and weight saving that is common to many fields of activity utilizing such control devices.

It is therefore an object of this invention to provide a frictional drive mechanism that is useful for both speed reduction and differential applications; that is extremely accurate; and that lends itself particularly to extreme miniaturization without any loss of accuracy or greatly increased cost; and that, at the same time, has a relatively simple construction. A further object is to provide a device of the character described in which the amount of undesirable backlash and resilience has been reduced to a minimum, and in which undesirable inertia effects have been substantially eliminated. Likewise, it is an object to provide a device in which there is a minimum of wear, but equally important, when and if wear occurs, it produces merely a change in ratio that is purely linear rather than the very undesirable non-linear change that normally occurs in a gear train type of drive arrangement, as a result of an increase in backlash. A still further object is to provide a device of the character described in which undesirable friction has been reduced to a minimum. Yet another object is to provide a device of the character described which has an inherent friction slip clutch action which may be adjusted to operate at a selected load, and therefore will serve to protect the operating mechanism from overload damage.

A further object is to provide a device which may be used in a ganged axial arrangement, and which when so arranged will have a low torque requirement at the input end of such an assembly but may have a relatively high torque load clutch release at the output end. Likewise, this ability to use such a device in ganged arrangement, when combined with the inherent slip clutch action, permits the tandem or ganged operation of several components, with one or more being driven in one direction to a selected stop position, while others continue to be driven continuously. Furthermore, with this arrangement signal transducers can be assembled in tandem one to the other without the undesirable reversing error normally encountered with gear trains when so assembled. Also the undesirable fulcrum effect of spring loaded or anti-backlash gears is eliminated.

Further objects and advantages of this invention will become evident as the description proceeds and from an examination of the accompanying drawings which illustrate several embodiments of the invention and in which similar numerals refer to similar parts throughout the several views.

In the drawings:

FIGURE 1 is a view in elevation, with certain parts cut away, of one form of device incorporating the invention, the device being shown disposed in association with a drive motor and a driven component in the form of a potentiometer.

FIGURE 2 is a somewhat diagrammatic representation of the operative relationship of certain of the components in the device shown in FIGURE 1.

FIGURE 3 is a perspective view of the rotating cage member shown in FIGURES 1 and 2.

FIGURE 4 is a view in elevation, with certain parts cut away, of an alternative form of device incorporating a number of basic units such as disclosed in FIGURE 1 assembled in ganged relationship.

FIGURE 5 is a somewhat diagrammatic showing of an alternative form of arrangement of the component parts shown in FIGURE 2.

FIGURE 6 is a fragmentary view in elevation, with certain parts broken away, of a modification of the form of device illustrated in FIGURE 5.

FIGURE 7 is a fragmentary view in elevation, with certain parts broken away, illustrating another modification of the form of device shown in FIGURES 5 and 6, providing for adjustability in certain parts.

FIGURE 8 is a fragmentary view of a modified form of housing element permitting adjustability in the dimensions thereof.

FIGURE 9 is a somewhat diagrammatic showing of the type of modified housing element shown in FIGURE 8, the view being an end view in vertical cross section.

FIGURE 10 is a somewhat diagrammatic view in elevation with certain parts broken away of a further modified form of device incorporating the invention.

FIGURE 13 is a somewhat diagrammatic view in elevation, with certain parts broken away, of an assembly of units substantially as shown in FIGURE 10 disposed in ganged relation and with a plurality of side takeoffs at different ratios.

FIGURE 14 is a somewhat diagrammatic view in elevation, with certain parts broken away, of still another embodiment of the invention comprising a combination differential and speed reducer.

FIGURE 16 is a somewhat diagrammatic view, with certain parts broken away, of another embodiment of the invention comprising a speed reducer with a modified form of cage member.

FIGURE 17 is a view in vertical section taken along the line 17—17 of FIGURE 16 in the direction of the arrows.

FIGURE 18 is a view in vertical section taken along the line 18—18 of FIGURE 16 in the direction of the arrows.

Figure 11:
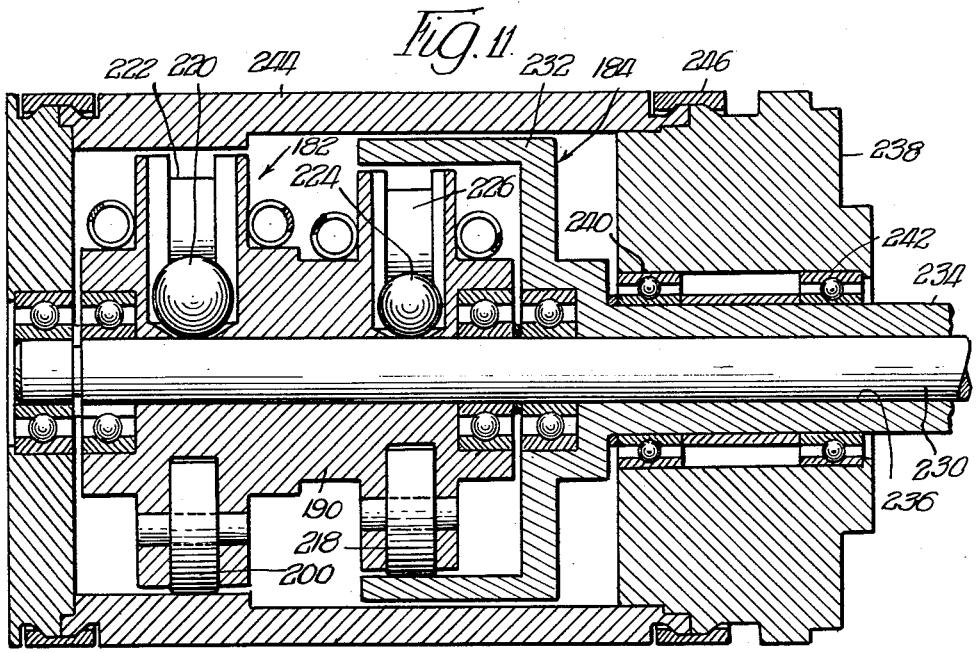
FIGURE 11 is a somewhat diagrammatic view in elevation with some parts broken away illustrating a single-end type of device, being a modification of the form shown in FIGURE 10.

Referring now to FIGURE 1, one form of drive mechanism incorporating the invention is shown therein in the form of a simple speed reducer. A housing 20 is provided, preferably in the form of a hollow cylinder, within which a cage 22 is rotatably mounted, being fixed to the shaft 24 which is in turn rotatably mounted in the bearing 26 fixed in the end wall 28. The opposite end of the housing 20 is adapted to be secured, in this instance, to the end 30 of the electric motor 32 by the clamp ring 34.

The cage 22 is provided with a central opening 36 which is adapted to receive the shaft 38 of the motor 32. As best shown in FIGURES 1, 2 and 3, the cage 22 is also provided with an annular slot 40 in a plane normal to the central opening 36 which slot has a plurality of rolling members rotatably disposed therein. As best shown in FIGURES 1 and 2, the base 42 of the annular slot 40 is preferably provided with a seat 44 in which the ball 46 is adapted to be retained. This seat 44 in turn is provided with a circular opening 48 through which the ball 46 can abut the shaft 38. The seat 44 is preferably given a configuration such that its diameter is larger than the diameter of the ball 46 so that, if properly positioned, the ball will rest only against the shaft 38 and other freely movable elements to be described.

Immediately above the ball 46, as best shown in FIGURE 2, two rollers 50 and 52 are rotatably mounted within the annular slot 40. The roller 50 is preferably in the form of an anti-friction bearing, which is mounted on a pin 54 fixed in the cage 22 so as to extend through the slot 40. The pin 54 is preferably of smaller diameter than the center opening in the roller 50 so that the axis of rotation of the latter has some freedom of movement in a lateral direction. The roller 52 is also preferably a true anti-friction bearing and is rotatably mounted on a pin 56 which extends through the slot 40 and is mounted in an opening in each side of the cage 22, which is substantially larger than the diameter of the pin 56 so that the pin has some freedom of movement. The diameter of the pin 56 is also preferably smaller than the diameter of the center opening in the roller 52.

A second ball 58 is preferably provided diametrically opposite the ball 46 in the cage 22 and has associated with it two rollers 60 and 62 identical to the previously described rollers 50 and 52. These rollers are mounted on pins 64 and 66 which are again substantially identical to the previously described pins 54 and 56, respectively. As best shown in FIGURES 1 and 3, the two pins 56 and 66 are interconnected by spring members 68 and 70 which lie on the two hubs 72 and 74, respectively, of the cage 22. These springs are normally under tension so that the roller 52, for example, is urged against the ball 46 in such a way as to force it against the shaft 38 and the roller 50. The resultant outward movement of the roller 50 causes it to abut the interior surface 76 of the housing 20, the pins 54 and 56 being positioned so as to permit the periphery of the rollers 50 and 52 to project slightly above the outer periphery of the cage 22 (as best shown in FIGURE 2) when the shaft 38 is inserted in the opening 36 in the cage 22.

As shown in FIGURES 1 and 2, the ball 46 is also raised out of abutment with the seat 44 by the shaft 38 and, being urged by the roller 52 to the left, as shown in FIGURE 2, the ball will in turn cause the roller 50 to take the position shown therein in abutment with the interior surface 76 of the housing 20. The roller 62, in like fashion, is urged against the ball 58 which in turn is urged against the roller 60 so that those elements take the position shown in FIGURE 2 when the shaft 38 is inserted in the opening 36.

This unit, as described, is a basic speed reduction unit which can be used alone, or in combination with additional units, in a number of different ways. In any event, when a single unit is used merely as a speed reducing device, a drive shaft is inserted in the opening 36 provided therefor such as the shaft 38 of the motor 32. As indicated in FIGURE 1, the housing 20 can be secured directly to the motor by the clamp ring 34 so that both the motor and housing are held stationary by some suitable mounting means (not shown). Prior to insertion of the shaft 38 in the opening 36, the balls 46 and 58 are normally seated within the seat 44 in such a way as to project substantially out of the opening 48 in the base of the seat 44. Insertion of the shaft 38 will cause the balls 46 and 58 to be lifted outwardly in a radial direction respectively. Such a movement of these elements will in turn increase the tension on the spring elements 68 and 70 so that the roller members 50 and 60 are urged into abutment with the interior surface 76 of the housing 20. This occurs because the resultant force exerted by the ball 46, for example, when it is urged against the shaft 38 by the roller 52, is in a direction such that the roller 50 is moved outwardly against the pin 54. The ultimate result of the roller 52 being urged in substantially a counterclockwise direction, as viewed in FIGURE 2, and the roller 62 being urged in a substantially clockwise direction by the spring element 70 extending therebetween on the shoulder 74, is to insure that the roller 52, the shaft 38 and the roller 50 are all in rolling frictional contact with the ball 46 when the shaft 38 is inserted in the opening 36 and likewise the roller 60, the shaft 38 and the roller 62 are also in rolling frictional engagement with the ball 58. In addition, as stated, the roller 50 and the roller 60 are in rolling frictional contact with the interior surface 76 of the housing 20.

Not only is this rolling frictional contact maintained between the rollers and the interior surface 76, but by the arrangement described it is maintained in such a way that there is no backlash in the drive mechanism regardless of the direction of rotation of the shaft 38. More specifically, if the shaft 38 is rotated in a clockwise direction as shown in FIGURE 2, the ball 46 will be rotated in a counterclockwise direction and the roller 50 will be rotated in a clockwise direction. If the housing 20 is maintained in a fixed position, the resultant effect will be to cause the roller 50 to roll around the interior surface 76 of the housing 20 in a counter-clockwise direction carrying with it the cage 22. The rollers 50 and 52 and the ball 46 will therefore have a planetary motion around the shaft 38, along with the cage 22 and all the other components carried thereby. The output shaft 24, as shown in FIGURE 1, has its inner end fixedly secured to the cage 22 and it is therefore rotated with the latter in a direction opposite to the direction of rotation of the input shaft 38. As previously described, through this arrangement the speed of rotation of the output shaft 24 will be substantially reduced in comparison with the speed of rotation of the input shaft 38.

It has been found that this ratio is in accordance with the formula $S/R-S$, where S is the diameter of the input shaft and R is the interior diameter of the housing. As a specific example, if the shaft diameter is .1246 inch and if the interior diameter of the housing is .8722 inch, the ratio is .1666 or a 6 to 1 ratio comparing the speed of rotation of the input shaft to the speed of rotation of the output shaft.

The pressure exerted by the spring members 68 and 70 on the roller 52 is such that the individual members of the train of rotating frictional elements including the shaft 38, the ball 46 and the roller 50 are moved into tightly abutting relation and the inner periphery of the roller 50 is moved against the right side of the pin 54, as viewed in FIGURE 2, and the roller itself is moved into tight engagement with the interior surface 76 of the housing 20. With the train of motion transmitting elements so disposed, clockwise rotation of the shaft 38 will in turn cause counter-clockwise rotation of the ball 46 and clockwise rotation of the roller 50 so that the latter will start moving in a counter-clockwise direction around the surface 76. Such movement of the roller 50 will cause the pin 54 and the cage member in which it is mounted to also move in a counter-clockwise direction, all as represented in FIGURE 2. The disposition of the train of elements as just described through the urging of the roller 52 is such as to prevent any lost motion between the input shaft 38 and the cage member 22. This is true because all of the motion transmitting elements are in firm engagement with each other including the rolling elements and the non-rolling elements such as the inner race of the roller 50 and the pin 54.

Obviously, if this same train of elements was relied upon to transmit counter-clockwise motion of the shaft 38 to the cage 22, there would be some lost motion at the start of such a counter-clockwise motion of the shaft 38 between the roller 50 and the pin 54 carried by the cage 22. Although the roller 50 would start to roll in such a direction, it would not carry the cage with it immediately because of the necessity of the left side of the inner race of the roller 50 (as viewed in FIGURE 2) coming into contact with the pin 54 before motion would be imparted to the cage 22.

To insure that when the shaft 38 is rotated in a counter-clockwise direction as shown in FIGURE 2, there is a similar absence of lost motion, the train comprising the shaft 38, the ball 58 and the roller 60 is provided diametrically opposite to the train previously discussed. The roller 62 is urged in a direction opposite to the roller 52 so that the roller 60 is in turn forced against the pin 64 in such a way that the right side of the latter is abutted by the inner race of the roller 60. If the shaft 38 is rotated in a counter-clockwise direction, the roller 60 will tend to roll along the inner surface 76 of the housing 20 in a clockwise direction. With the pin 64 and the roller 60 engaged as described, the initiation of rotation in a counter-clockwise direction of the shaft 38 will be immediately reflected in movement of the roller 60, the pin 64 and the cage 22, just as was described in connection with movement of this cage member when the roller 50 moves in a counter-clockwise direction.

The undesirable effects of backlash are therefore eliminated when the device is first assembled. In addition, however, there is an automatic elimination of backlash by this type of arrangement even if the components become worn. This is a tremendous advantage over the conventional gear train system wherein wear will tend to increase the amount of backlash. In the present device any decrease through wear in the diameter of the motion transmitting elements in the two trains described will not result in an increase in backlash. Any dimensional change will be compensated for by the fact that the free rolling balls are continually urged into wedged engagement with the remaining rotating elements in each train so that any slack will be automatically taken up by a shift in position of this element. Furthermore, it should be pointed out that, since the balls 46 and 58 and the rollers 50, 52, 60 and 62 are merely motion transmitting elements utilizing rolling surface contact, a change in the diameter of any of these elements will not effect the operation of the device insofar as a change in ratio is concerned. Furthermore, if as a result of wear the diameter of the shaft 38 becomes reduced and/or the interior diameter of the housing 20 becomes increased, the ratio of the device will be changed in a completely linear fashion. A change of this type can be tolerated in many types of installations where a non-linear change would be highly disadvantageous, such as in servomechanism devices.

Such a change in ratio will normally be very slight but even this can be practically eliminated by a proper design of the equipment since the rollers and ball members can be made of softer material than the input shaft 38 or the housing 20 so that substantially all the wear occurs in the rollers and the ball members. As pointed out above, wear or changes of dimension in these elements has no effect on the ratio. Such a characteristic permits the attainment of a precision in such devices which does not degenerate rapidly with operation and resultant wear. This then is another important advantage of the invention.

Not only is the major undesirable characteristic of backlash eliminated, but there are added advantages of substantially equal importance in this type of construction. For example, the error which is attributable to the resilience of the components, such as is present in a gear train, is very substantially reduced in this type of arrangement. The use of a reduced number of shafts of rotation to minimize torsional deflection, together with the elimination of the undesirable effect of gear tooth bending through the use of rolling frictional drive elements, both serve to reduce resiliency in the system to a minimum.

A further advantage exists in that the arrangement of components is such as to substantially eliminate any undesirable inertia effects. This is true because the preloading of the ball and roller with respect to the housing which is normally stationary causes the housing to act as a brake against inertia, whenever the input shaft is stopped. In other words, when the input shaft stops, the planetary members are also immediately stopped by the braking action of the fixed housing. Therefore, there is no substantial force of inertia exerted on the shaft by the planetary members once the shaft is brought to a stop. The spring members 68 and 70 operate to maintain the rollers 50 and 60 in firm frictional contact with the interior surface 76 of the housing 20 under such circumstances. The device is, therefore, spring damped against inertia and hunting in the controlled component or from component to component is substantially eliminated.

Still another advantage is the fact that the parts are so arranged as to reduce undesirable friction to a minimum. For example, the ball members 46 and 58 are normally freely rotating without contact with any members other than those which are rotating with them, as best shown in FIGURE 1. It may be that the balls 46 and 58 will at times come into contact with the sides of the annular groove 40 but even if this occurs, the frictional drag is at a minimum because contact of this type takes place at the points of minimum motion, namely, on the axis of rotation of the balls, as they are moved by the input shaft 38. Furthermore, the rollers 50, 52, 60 and 62, as previously described and shown in FIGURE 1, may be in the form of anti-friction bearings so that friction that otherwise might be introduced between the stationary pins 54, 56, 64 and 66 and the rollers is substantially eliminated since the inner race of the bearings is in contact therewith.

Still another very desirable characteristic of the construction as described is the fact it embodies a built in slip clutch arrangement that is very desirable in many types of installations. The amount of load which can be carried by the output shaft 24 can be readily adjusted by varying the loading pressure of the springs 68 and 70. In other words, since the drive is frictional, if the load increased to the point where the frictional contact of the rolling elements is not sufficient to carry such a load, a slippage will occur. Such slippage is not of a nature that it will normally result in any damage to the components which of course distinguishes this type of device completely from one which incorporates a gear train.

As previously mentioned, the basic unit as shown in FIGURE 1 can be combined with additional units in any desired manner to achieve further speed reduction when desired. This type of assembly has an added significant advantage in that it lends itself to being disposed in a ganged relationship in an axial arrangement. Such a combination or arrangement is shown in FIGURE 4 in which a motor, two basic speed reduction units in one housing, a potentiometer, a third basic speed reduction unit, and a second potentiometer are all combined in an axially ganged arrangement so that the two potentiometers are driven at selected r.p.m.'s by the same motor.

As shown in FIGURE 4, the motor 32 is secured to a housing 78 which is similar to housing 20 previously described in connection with FIGURE 1 but may be approximately twice the length of housing 20. The housing 78 is secured to the motor 32 by a ring clamp 34 so that the shaft 38 of the motor protrudes into the housing. The shaft 38 is received by the opening 36 in a drive assembly of the identical construction as previously described in connection with FIGURES 1, 2 and 3. However, the output shaft 24 of this first basic unit is in turn received within the opening 80 in a second basic drive unit identified generally by the numeral 82. This second unit 82 is provided with an output shaft 84 extending through a suitable bearing 86 in the housing 88 for the potentiometer indicated generally by the numeral 90. The potentiometer housing 88 is secured to the housing 78 by a suitable clamp ring 92. The rotating member 94 of the potentiometer 90 is fixed to the output shaft 84 so as to be rotated thereby and the shaft 84 extends into the third housing member 96 through a suitable bearing 98.

The housing 96 is provided for a basic unit of the character initially described above and shown in FIGURE 1. This unit is indicated generally by the reference numeral 100. The output shaft 102 of this latter unit extends into the housing 104 through a suitable bearing 106, the housing 104 being secured to the housing 96 by a suitable clamp ring 108. The potentiometer having the housing 104 is indicated generally by the numeral 110 and the rotary member 112 thereof is secured to the output shaft 102 so as to be rotated thereby. The output shaft 102 may extend through a suitable bearing 114 in the end closure member 116, the latter being secured to the housing 104 by the clamp ring 118.

As is evident from the showing in FIGURE 4, this whole assembly is axially aligned and has the obvious advantages stemming therefrom including the substantial elimination of undesirable resiliency effects insofar as accuracy of movement is concerned. Likewise, it lends itself very well to miniaturization since the various components which are disposed within the housing members can be quite small without losing any of their effectiveness. For example, the ball members 46 and 58 can have a diameter of 5/32 of an inch and the entire assembly can in such an arrangement have an outer diameter of approximately one inch.

The operation of this combination is apparent from the construction. The input shaft drives the first unit so that the cage 22 rotates in a direction opposite to the direciton of rotation of the input shaft as described previously in connection with FIGURE 1. The shaft 24 is the input shaft for the second unit 82 and similarly, the output shaft 84 of the second unit 82 is rotated at a further reduced speed in the original direction of the motor shaft 38 so that the rotary member of the potentiometer 90 is rotated in the same direction as the motor shaft but at a substantially reduced speed. If the ratio is 6 to 1 as previously mentioned with respect to FIGURE 1 in each of the two assemblies assuming a motor r.p.m. of 3600, the first potentiometer will be rotated at a speed of 100 r.p.m. The drive assembly 100 will again operate to reduce the speed of the shaft 84 so that the end potentiometer 110 will be rotated at 16.67 r.p.m.

As previously mentioned, the particular construction incorporated in the drive units is such as to substantially eliminate any backlash effects. This is particularly desirable and important with respect to ganged assemblies of the form shown in FIGURE 4 since when the motion is reversed any error of backlash which occurs in potentiometer 110 would be reflected in the next potentiometer at a 6 to 1 ratio and so on through the device back to the forward end of the assembly.

The declutching characteristic previously described is also particularly advantageous in a ganged assembly such as illustrated in FIGURE 4 since the declutching will occur in any drive unit beyond which the load has increased above capacity. For example, potentiometer 110 could be stopped by some malfunction which would cause drive unit 100 to slip but potentiometer 90 would be driven in normal fashion in spite of the declutching of potentiometer 110.

Although the basic unit incorporated in FIGURES 1 through 4 has the two roller members adjacent the inner surface of the housing 20, it is equally possible to transpose the positions of the roller members and the ball members as shown in FIGURES 5 and 6, which are somewhat diagrammatic illustrations of this alternative form of drive unit. As shown in FIGURE 6, the ball members 120 and 122 are each retained in a seat 124 in the cage 126. A suitable annular slot 128 is centrally provided therein adapted to have the roller or ring members 130, 132, 134 and 136 rotatably mounted therein so that each projects inwardly into the center opening 138 in the cage 126 through access openings provided in the hub portion 140 of the cage 126. Suitable spring members 142 and 144 are provided to urge the rollers 132 and 136 in a counterclockwise and clockwise direction, as shown in FIGURE 5, the pins 146 and 148, upon which the rollers 132 and 136 are mounted, being disposed in openings 150 and 152 in the sides of the lateral groove 128, which openings have a diameter somewhat larger than the diameter of the pins received therein. Rollers 130 and 134 on the other hand are mounted on pins 152 and 154 which are firmly secured in the cage and extend through the lateral groove 128.

The roller 132 being urged in a counter-clockwise direction, as viewed in FIGURE 5, is adapted to bear against the ball member 120 which in turn bears against the interior surface 156 of the housing 158 and also against the roller 130. Roller 136 in similar fashion bears against the ball 122 which in turn bears against the interior surface 156 and the roller 134. The opening 138 in the cage 126 is adapted to receive the input shaft 160 and the rollers 130, 132, 134 and 136 all are normally in abutment with the shaft 160. The rotation of the shaft 160 therefore is imparted to the rollers and just as in the case of the unit previously described and represented in FIGURES 1, 2 and 3, the two assemblies of rollers and balls are so disposed that they form a rolling frictional contact between the drive shaft or input shaft 160 and the interior surface 156 of the housing 158 regardless of which direction the input shaft 160 is rotated. The output shaft 162 has its inner end secured to the cage 126 at a reduced speed in comparison with the speed of rotation of the input shaft 160.

All of the advantages previously mentioned with respect to the forms shown in FIGURES 1, 2 and 3 are equally applicable to this alternative form illustrated in FIGURES 5 and 6. It likewise is similarly capable of being used in various combinations to achieve the specific results desired in driving mechanisms.

Another alternative construction (not shown) involves the use of substantially cylindrical elements or rollers in place of the ball members 46 and 58, preferably slightly crowned so as to be adaptable to variations in alignment. These would not be as free from undesired friction as the balls, but in some instances would suffice. Similarly, in inexpensive constructions where reduction of undesired friction was not a requirement, the rollers 50, 52, 60 and 62 could be in the form of simple roller rings, without bearings incorporated therein.

FIGURE 7 shows a construction of housing which permits changes in ratio by screw adjustments. As shown therein, the housing 164 is provided with a plurality of adjustable set screws 166, the conical inner ends of which are adapted to bear against the ring members 168 and 170 as shown in FIGURE 7. These ring members in turn have a beveled edge 172 and 174, respectively, against which the ball member 120 is adapted to roll. As the set screws 166 are moved outwardly, the two rings 168 and 170 will move away from each other so as to permit the ball member 120 to abut a portion of the beveled edges 172 and 174 that is farther removed from the input shaft 160. As the set screws 166 are moved inwardly, they cause the rings 168 and 170 to move together and thus cause the ball member 120 to roll in abutment with the portion of the beveled edges 172 and 174 which is closer to the input shaft thus effectively reducing the diameter of the interior surface against which the ball 120 rolls.

A somewhat similar method of varying the inner diameter of the housing and thus the ratio of the drive mechanism that is useful with the form of drive member shown in FIGURES 1 to 3, is represented in FIGURES 8 and 9. In this form a plurality of set screws 176 are provided in the housing 178 and are adapted to retain a sleeve 180 within the housing 178 against which the rollers 50, 52, 60 and 62 are adapted to roll. Obviously, sleeves of varying interior diameters could be inserted in the housing 178 and held in place by the set screws 176 thus altering the ratio of the drive mechanism as desired.

A number of useful drive mechanisms can be formulated utilizing what might be characterized as a dual basic unit, as illustrated in FIGURE 10. As shown therein, a cage member is provided which is in effect a unitary, double cage of the form utilized in the basic drive member first described. In addition however, the second portion, although a substantial duplicate of the first portion, has a different diameter, for purposes that will be described below. More specifically, in addition to the portion of the cage member indicated generally by the numeral 182, which is substantially identical to the cage member 22 in FIGURE 1, a second cage member portion of substantially similar form but different diameter, indicated generally by the numeral 184, is integrally formed therewith. The opening 186 that is adapted to receive the input shaft 188 extends through the entire dual cage member 190, the latter being rotatably mounted thereon in bearings 192 and 194 provided at each end, respectively, of the cage member 190.

A housing 196 encompasses the cage member 190 and is provided with an interior surface 198 of reduced diameter at the end thereof associated with the portion 182 of the cage 190. This surface 198 is adapted to be abutted by the rollers of the initial portion 182 of the cage 190, such as the roller 200 illustrated. The remaining portion of the housing 196 encompasses a drive cup 202 mounted on the output shaft 204 which is, in turn, rotatably supported in the bearings 206 and 208 in the hub 210 of the end closure 212, which is secured by the clamp ring 214 to the housing 196. The cup 202 encompasses, in turn, the second portion 184 of the cage 190 and the interior surface 216 thereof is adapted to be abutted by the rollers carried by the portion 184 of the cage 190, such as the roller 218.

This assembly, as shown in FIGURE 10, is useful as a speed reducer and is particularly applicable for ratios of 40 to 1 or larger, permitting extremely large ratios. The operation of the first portion 182 of the cage is identical to the operation described in connection with the form shown in FIGURES 1, 2 and 3. The cage rotates at a reduced speed and the operation of the cage portion 184 is of course effected thereby. The rollers in this cage portion, such as the roller 218, make rolling frictional contact with the interior surface 216 of the cup 202 and, since it is mounted on the rotatable output shaft 204, it is driven by the rotation of the rollers such as the roller 218. If it is assumed that the input shaft 188 is rotating in a counter-clockwise direction when viewed from the left end as shown in FIGURE 10, then the ball 220 in the first portion 182 of the cage will rotate in a clockwise direction, as viewed from the left end of the assembly. This in turn will cause the rollers 200 and 218 to rotate in a counter-clockwise direction when viewed from the left. The cage member will therefore rotate in a clockwise direction when viewed from the left and this includes the portion 184 of the cage. The ball 224 and the rollers 218 and 226 are disposed in the portion 184 of the idler in the same fashion as the ball 220 and the rollers 200 and 222 in the portion 182. The ball 224 is in rolling engagement with the shaft 188 so that if this shaft is rotated in a counter-clockwise direction as viewed from the left, the ball 224 will be rotated in a clockwise direction as viewed from the same end. Likewise, the rollers 218 and 226 will be rotated in a counter-clockwise direction when viewed from that end, and will tend, in turn, to rotate the cup 202 is a counter-clockwise direction when viewed from the left end. Therefore the output shaft 204 will also be rotated in a counter-clockwise direction when viewed from the left end thereof, as shown in FIGURE 10.

Since the portion 184 of the cage is rotating in a clockwise direction when the rollers 218 and 226 are driving the cup 202 in a counter-clockwise direction, the rotation of the cage actually subtracts from the rotation of the cup 202, so that a further reduction is accomplished in the speed of the output shaft 204 by this means. Of course another major reduction is accomplished by the rotation of the cup 202 through the train of the ball 224 and the rollers such as the rollers 218 and 226, so that the ultimate reduction from the shaft 188 to the shaft 204 is very substantial. The determining factors in how substantial this reduction is are the dimensions of the diameter of the input shaft 188, the interior diameter of the housing 196 at the surface 198 and the interior diameter at the surface 216 of the output cup 202 in accordance with the following formula:

$$-\left(\frac{S}{R-S}\cdot\frac{R'-S}{R'}\right)+\frac{S}{R'}=\frac{1}{\text{Ratio}}$$

where S is the diameter of the input shaft, R is the interior diameter of the housing adjacent the portion 182 of the cage and R' is the interior diameter of the output cup 202.

A slightly modified form of speed reducer, similar to the one shown in FIGURE 10, is shown in FIGURE 11. This modification is a single end speed reducer in which the input shaft and the output shaft are at the same end of the assembly. The input shaft 230 extends through the complete assembly into association with the balls 220 and 224, as was the case in the form shown in FIGURE 10. The output cup 232 however is formed integrally with the output shaft 234, the latter having an axial opening 236 extending therethrough adapted to receive the input shaft 230. A suitable end closure 238 is provided having suitable bearings 240 and 242 provided therein through which the putput shaft 234 extends. The end closure 238 is secured to the housing 244 by a suitable clamp ring 246.

Other than the difference in arrangement of the input and output shafts, this device operates substantially in the same manner as the device disclosed in FIGURE 10 previously discussed.

Figure 12:
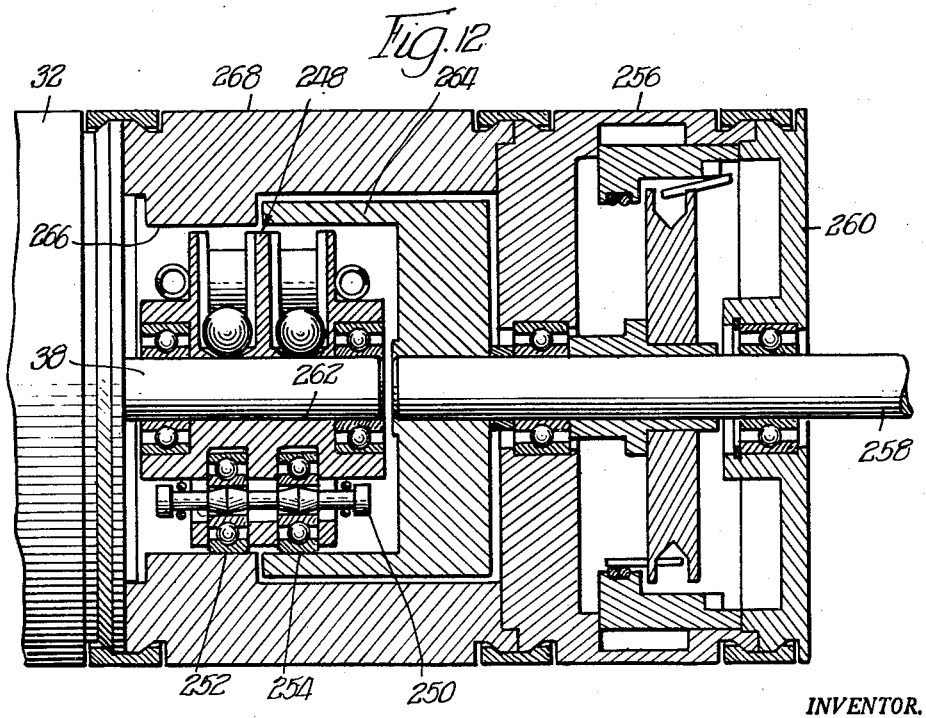
FIGURE 12 is a view in elevation, with certain parts broken away, of another modification of the form of device shown in FIGURE 10, utilizing a modified cage member.

Still another modification of the form of device shown in FIGURE 10 is illustrated in FIGURE 12. This device incorporates a modified form of cage member indicated generally by the numeral 248. This differs principally from the form of cage shown in FIGURE 10 in the fact that there is a common pin member such as the pin 250 provided for each adjacent pair of rollers such as the rollers 252 and 254 rather than a separate pin for each roller. Such an arrangement eliminates two of the spring members extending between the ends of the pins and also reduces the length of the cage member substantially. The other component parts are modified accordingly, as to their specific dimensions and shape, but otherwise the unit operates in substantially the manner described for the unit shown in FIGURE 10. A potentiometer 256 is shown in association with the output shaft 258, the potentiometer being provided with an end closure 260. The opposite end of the unit is secured to the end face of the motor 32 so that the motor shaft 38 projects into the central opening 262 provided in the cage member 248.

The two halves of the cage member 248 are shown to be substantially symmetrical, although if the interior diameter of the output cup 264 is exactly the same as the interior diameter of the area of reduced diameter 266 of the housing 268, there will be no resultant motion of output shaft 258. In other words, the motion of the cage 248 will be such as to compensate for the motion of the rollers disposed in association with the cup 264, as is the roller 254, and the latter will remain stationary. If the interior diameter of the cup 264 is smaller than the interior diameter of the surface 266, then the cup 264 will rotate in the same direction as the input shaft 38 at a reduced rate. If the diameter of the interior of the cup 264 is larger than the diameter of the surface 266 of the housing 268, the cup 264 will move in a direction opposite to the direction of movement of the input shaft also at a reduced rate. The nearer the diameters are to being equal, the greater the speed reduction will be.

Another modification of the device shown in FIGURE 10 is that shown in FIGURE 13 in which a plurality of devices, such as shown in FIGURE 10, are incorporated in ganged, axially aligned relationship. The motor 32 is provided with an elongated shaft 270 upon which is mounted a series of axially aligned units indicated generally by the numerals 272, 274 and 276. Each of these units is generally similar to the form shown in FIGURE 10 but is provided with an output cup 278 of slightly altered form, together with a modified form of housing member 280. The output cup 278 has integrally mounted therewith an output gear 282 and a suitable arcuate slot opening 284 is provided in the housing member 280 so that a portion of the output gear 282 is exposed. This permits a power takeoff at the output gear 282 through the medium of another gear member 285 mounted with respect to the assembly so that it is in meshed engagement with the output gear 282 and is driven thereby. The output cup 278 also has an additional bearing 286 provided in the hub 288 thereof to provide proper support therefor. The housing 290 of the next unit 274, which is substantially identical to the first unit described, is secured by the clamp ring 292 to the housing 280 of the first unit 272. The housing 294 of the third unit 276 is similarly secured by the clamp ring 296 to the housing 290 of the second unit 274. Suitable output gears 298 and 300 are provided in the second and third units 274 and 276 and takeoff gears 302 and 304 are disposed as to be in mesh therewith, respectively.

This assembly therefore comprises three basic units of the type shown in FIGURE 10 but also incorporates three side takeoffs so that the speed of rotation of the motor shaft 270 can be reduced in three stages, with an output being available at each stage of speed reduction. Here again the axial arrangement of the components permits miniaturization to a degree not obtainable by conventional gearing methods of reduction and, in addition, the same advantages previously mentioned with respect to backlash, inertia, wear and friction are present in this construction, as previously described.

All of the devices previously described have been speed reduction devices. As previously stated, however, the invention is also useful as a combination differential and speed reducer. Such a modification is shown in FIGURE 14 wherein a cage member, indicated generally by the numeral 306, is provided having substantially the same construction as the cage member shown in FIGURE 10. This cage member is rotatably mounted on the input shaft 308 which is rotatably received in the opening 186 provided for that purpose therein. The first portion of the cage member, indicated generally by the numeral 182, is encompassed by an input cup member 310 also rotatably mounted on the input shaft 308 through the bearing members 312 and 314. The inner surface 316 of the input cup 310 is adapted to abut the rollers 200 and 222 substantially in the same fashion as the interior surface 198 of the housing 196 of the form shown in FIGURE 10. However, the input cup 310 is also provided with an integrally formed input gear 318 so that the input cup can be externally rotated in any desired fashion.

The second portion of the cage member, indicated generally by the numeral 184 is encompassed by a housing 320, one end of which is in close spaced relation to the inner end of the input cup 310 and the other end of which is supported by the potentiometer 322 through the clamp ring 324. Obviously, the potentiometer 322 is also suitably supported in fixed relation to the output shaft 326 by suitable means not shown.

Also encompassing the second portion 184 of the cage member 306 within the housing member 320 is the output cup 202 which is identical with the output cup 202 of FIGURE 10 and is adapted to be driven by the rollers 218 and 226 in the second portion 184 of the cage member 306.

The operation of this modified form is substantially the same as the operation of the form shown in FIGURE 10, except that the input cup 310 may be rotated with respect to the input shaft 308. Obviously, depending upon the direction of rotation of the input cup 310, the resultant rotation of the cage member 306 from the rotation of the input shaft 308 will be modified accordingly. Specifically, if the gear member 318 and the input cup 310 are rotated in the direction which is the same as the direction of rotation of the input shaft 308, the speed of rotation of the cage member 306 will be reduced, while if the direction of rotation of the gear 318 and the cup member 310 is in the opposite direction to the rotation of the input shaft 308, the resultant speed of rotation of the cage member 306 will be increased. Needless to say, if the input cup 310 remains stationary, the device will operate in the same fashion as the form of device shown in FIGURE 10. In any event the resultant manner of operation is such as to make the device a combination differential and speed reducer.

Just as in the case of the basic unit shown in FIGURE 1, this basic combination differential and speed reducer unit shown in FIGURE 14 can be utilized in ganged assemblies or combinations.

Figure 15:
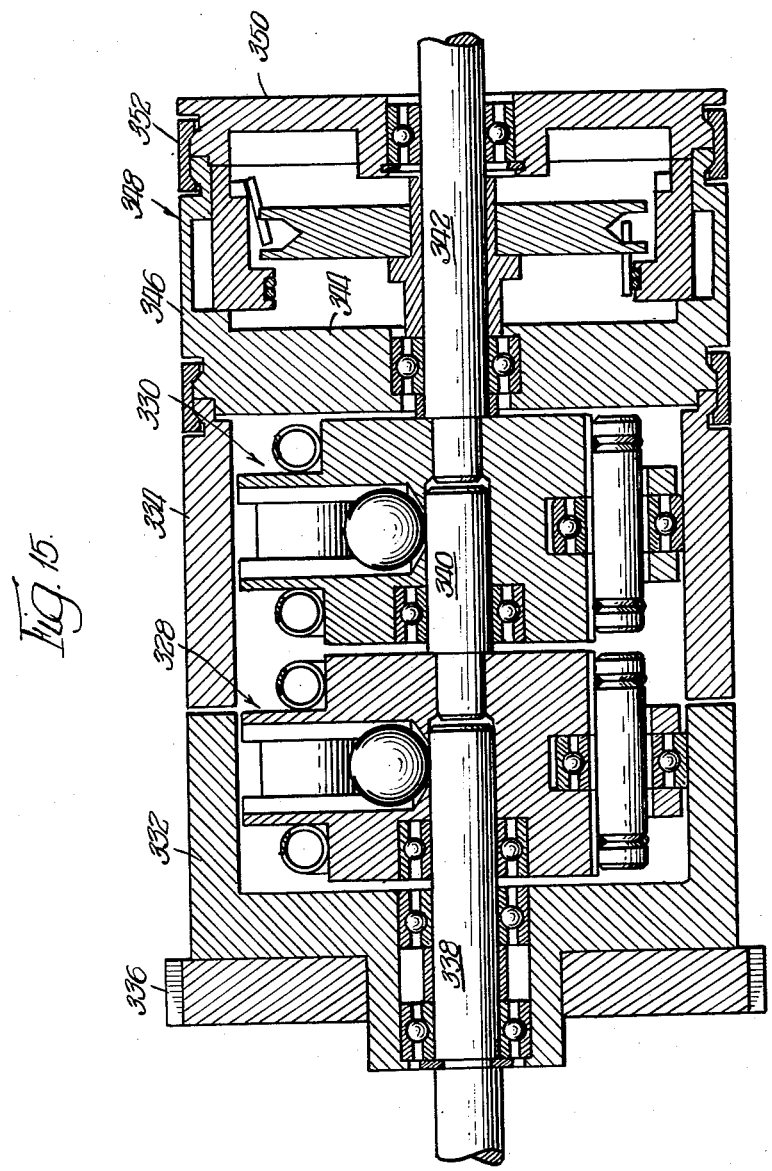
FIGURE 15 is a somewhat diagrammatic view, with certain parts broken away, of yet another embodiment of the invention comprising another form of combination differential and speed reducer.

Another modified form of the invention comprising a combination differential and speed reducer is shown in FIGURE 15, wherein the two cage members, indicated generally by the numerals 328 and 330, are provided having substantially the same construction as the cage members in the housing 78 of FIGURE 4. However, instead of a single housing, the two housing members 332 and 334 are provided, in association with the cage members 328 and 330, respectively. The housing 332 has an input gear member 336 secured thereto so that the housing 332 can be externally rotated in any desired fashion. The housing 332 is rotatably mounted on the input shaft 338 as is the cage member 328. This latter element has an output shaft 340 affixed thereto upon which the cage member 330 is rotatably mounted. The cage member 330 is provided with an output shaft 342 secured thereto extending through the forward wall 344 of the housing 346 of the potentiometer, indicated generally by the numeral 348, and the end wall 350 thereof. The end wall 350 is secured to the housing 346 by the clamp ring 352, as shown.

The operation of this form of device is similar to the operation of the first half of the form shown in FIGURE 4, except that the housing 332 may be independently rotated with respect to the input shaft 338, substantially in the same fashion as was described in connection with FIGURE 14. The resultant rotation of the cage member 328 is in accordance with both the rotation of the shaft 338 and the gear 336 and is such as to make the first portion of the device a combination differential and speed reducer, with a further speed reduction being accomplished through the second cage member 330 associated with the fixed housing 334. Suitable control of the potentiometer 348 is thus achieved in accordance with the input applied to the input shaft 338 and the input applied to the gear 336.

Here again this basic, combination differential and speed reducer unit, shown in FIGURE 15, can also be utilized in suitable ganged assemblies or combinations as desired to achieve particular control operations.

FIGURE 16 discloses another embodiment of the invention in the form of a speed reducer, which incorporates a plurality of cage members with a construction somewhat different than those previously shown and described. In this form, the number of planetary members associated with each cage member is reduced, as best shown in FIGURES 17 and 18. Instead of a train of two rollers and a ball, as the motion transmitting unit, a train of only two rollers is utilized as will be described below.

As best shown in FIGURE 17, the input shaft 354 has a cage member 356 associated therewith so that the roller members 358 and 360 are normally disposed in rolling frictional contact therewith, these two members being rather loosely mounted on the two pins 362 and 364, respectively, carried by the cage member 356. Another roller 366 is normally disposed between and in rolling frictional contact with the roller 358 and the interior surface 368 of the housing 370. The roller 366 is normally urged into and maintained in this position by the spring member 372 which is disposed on the hub 374 of the cage member 356 and is secured at one end to the pin 376 fixed to the cage member 356. The other end of the spring 372 is secured to the yoke member 378, which is secured in turn, to the two ends of the shaft 380 upon which the roller 388 is rotatably mounted. The shaft 380 is loosely carried by the cage member 356 in suitable openings 382 and 384 provided therein, as best shown in FIGURE 16.

The roller 388, similar to the roller 366, is likewise normally disposed so that it is in rolling frictional engagement with the interior surface 368 of the housing 370 and the roller 360, as best shown in FIGURE 17. A spring member 390, similar to the spring member 372, is supported by the hub 374 of the cage 356 and has one end thereof secured to the yoke member 392, which is, in turn, secured to the two ends of the shaft 386 carrying the roller 388. The opposite end of the spring 390 is secured to the pin 394 carried by the cage member 356. The cage 356 has two flanges 396 and 398 extending outwardly from the hub 374, as best shown in FIGURE 16, and the rollers 366 and 388 are disposed therebetween so that they extend inwardly toward the shaft 354 through suitable openings 400 and 402, respectively, provided for that purpose in the hub 374, as best shown in FIGURE 17.

Operation of this first cage portion of the speed reducer is generally similar to that previously described for the first cage assembly of the form shown in FIGURE 4, in that rotation of the shaft 354 will cause the rollers 358 and 360 to rotate in a direction opposite to the direction of rotation of the input shaft 354. The rollers 366 and 388 will be rotated in the same direction as the input shaft 354 and therefore will tend to drive the cage member 356 in the opposite direction of rotation as the shaft 354.

Additional elements of the speed reducer are rotatably mounted on the output shaft 404, which is rotatably supported by the hub 406 on the housing 370 in axial alignment with the input shaft 354. A laterally extending hub 408 on the first cage member 356, previously described, has a central opening 410 therein in which an idler bearing 412 is suitably secured as by press fitting and this bearing 412 has the output shaft 404 received therein. The bearing 412 is provided with a flange 414 on its outer extremity, as best shown in FIGURE 18, which provides an interconnection with additional components, as will be described.

As shown in FIGURES 16 and 18, a second cage member 416 is rotatably mounted on the output shaft 404 through the bearing 418, generally similar to the bearing 412. The bearing 418 is mounted in the hub 420 of the second cage member 416 which has a configuration generally similar to the first cage member 356. Suitable rollers 422 and 424 are rather loosely mounted on pins 426 and 428, respectively, carried by the cage member 416. These two rollers 422 and 424 are disposed in rolling frictional contact with the flange 414 on the bearing 412 of the cage member 356, as best shown in FIGURE 18, and are also in rolling frictional contact with the additional rollers 430 and 432. These two rollers 430 and 432 are substantially identical to the previously described rollers 366 and 388 and are normally urged into contact with the rollers 422 and 424 by the spring members 434 and 436, respectively, which are substantially identical to the spring members 372 and 390 previously described. Likewise, the rollers 430 and 432 are normally adapted to be in rolling frictional contact with the interior surface 368 of the housing 370. Such an arrangement will cause the cage member 416 to normally be driven in a direction of rotation which is opposite to the direction of rotation of the flange 414. The speed reduction, which is brought about by the operation of the cage member 356 and its associated components, is therefore further reduced by operation of the cage 416 and its associated components.

The cage 416 could be secured to an output shaft such as the shaft 404, so as to drive it directly, but in the embodiment illustrated in FIGURE 16, an additional cage member 438 is provided. This member is substantially identical to the cage member 416 except that it is secured through the hub 440 to the drive shaft 404. The cage member 438 will rotate in a direction opposite to the direction of rotation of the flange 418 on the cage member 416 so that the rotation of the output shaft 404 will be in the same direction as the input shaft 354 and again, at a reduced speed in comparison with the speed of rotation of the flange 418.

Although the embodiment shown in FIGURE 16 is a speed reducer, it is believed to be apparent (in the light of the showing in FIGURES 14 and 15) that a combination differential and speed reducer could be readily provided if the portion of the housing 370 which is in association with the cage member 398 were made rotatable relative to the input shaft 354, and if a suitable gear member were provided for accomplishing that rotation.

In the drawings and specification, there has been set forth several preferred embodiments of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

I claim:

1. A planetary friction gear drive comprising: a rotatable cage member; a housing having a cylindrical interior surface encompassing said cage member; a power output means operatively connected to said cage member; and a train of three planetary members in rolling frictional contact, disposed so that at least one of said planetary members is resiliently urged outwardly into rolling frictional contact with said interior surface of said housing by resilient means carried by said cage member exerting a force in a plane substantially normal to the axis of rotation of said planetary members; and at least one of the others of said planetary members is resiliently urged inwardly by said resilient means so as to be in rolling engagement with and frictionally driven by a drive shaft disposed on the axis of rotation of said rotatable cage member, two of said planetary members being rotatably mounted on said rotatable cage member so that rotation of said drive shaft member causes said cage member to rotate relative to said housing.

2. A planetary friction gear drive comprising: a housing; a cage member rotatably mounted within a cylindrical opening in said housing; a power output means operatively connected to said cage member; and a train of three planetary members, two of which are rotatably mounted on said cage member, with the other of said planetary members disposed therebetween in rolling frictional contact therewith, at least one of said planetary members being resiliently urged outwardly into rolling frictional contact with the surface of said opening in said housing by resilient means carried by said cage member exerting a force in a plane substantially normal to the axis of rotation of said planetary member and at least one of the other of said planetary members being resiliently urged inwardly by such a force so as to be frictionally driven by a drive shaft inserted within said rotatable cage member along the axis of rotation thereof so that rotation of said drive shaft member causes said cage member to rotate relative to said housing.

3. A planetary friction gear drive comprising: a rotatable cage member; a housing having a cylindrical interior surface encompassing said cage member; a power output means operatively connected to said cage member; and a train of three friction gear members disposed with only two of the axes of rotation thereof co-planar, said train being disposed between the interior surface of said housing and the side surface of said shaft, the two end members of said train being rotatably mounted on said cage member and disposed in rolling frictional engagement with one such surface and the center member being disposed in rolling frictional engagement with the other such surface, resilient means carried by said cage member normally urging one of said end members in a direction substantially normal to its axis of rotation so that the middle member of said train is normally urged to move outwardly from between said two end members.

4. A planetary friction gear drive comprising: a drive shaft; a rolling motion-transferring element in rolling frictional contact with said drive shaft; a driven cage member rotatably mounted with respect to said drive shaft; a pair of rollers rotatably mounted on said cage member; a power output means operatively connected to said cage member; means carried by said cage member resiliently urging said rollers into rolling frictional contact with said motion-transferring element by a force applied in a plane substantially normal to the axes of rotation of said rollers; and an annular member, the inner surface of which is in rolling frictional contact with said rollers, so that said cage member will rotate in a direction opposite to the direction of rotation of said drive shaft when said annular member is held stationary.

5. A planetary friction gear drive comprising: a driven cage member adapted to receive and rotate about the longitudinal axis of a drive shaft member; an inside frictional gear disposed in concentric relation to said drive shaft and said cage member; a power output means operatively connected to said cage member; a train of three planetary friction gears each rotatably mounted on said driven cage member; and means carried by said cage member resiliently urging at least one of said planetary friction gears into driven frictional contact with said drive shaft member and at least one other of said gears into frictional contact with said inside frictional gear by a force applied in a plane substantially normal to the axis of rotation of said planetary friction gear so that rotation of said drive shaft causes said driven cage member to rotate.

6. A frictional drive for transmitting rotary motion comprising: an annular cage member having a central opening adapted to rotatably receive a drive shaft; a power output means operatively connected to said cage member; a train of at least three friction gear members two of which are loosely and rotatably mounted on said cage member, with the axes of rotation of said friction gear members disposed in at least two planes, the periphery of at least one of said members normally projecting outwardly beyond the outer periphery of said cage and the periphery of at least one other of said members normally projecting inwardly into said central opening; and resilient means carried by said cage member normally urging said members into such positions and in contact with the cylindrical interior surface of a fixed housing encompassing said cage by a force applied in a plane substantially normal to the axes of rotation of said friction gear members, so that rotation of said drive shaft in one direction will cause said cage to rotate in the opposite direction.

7. In a planetary friction gear drive, a planetary assembly comprising: a cage member adapted to be rotatably mounted on a drive shaft; a train of at least three friction gear members two of which are loosely and rotatably mounted on said cage member; and resilient means carried by said cage member urging one of said friction gear members into rolling frictional contact with the second of said friction gear members through a force applied in a plane substantially normal to the axis of rotation of said friction gear member, said second friction gear member in turn being urged into rolling frictional contact with the third friction gear member so as to have a component of force applied to said third friction gear member in a radial direction relative to said cage member.

8. In a planetary friction gear drive, a planetary assembly comprising: a cage member adapted to be rotatably mounted on a drive shaft; a pair of trains of at least three friction gear members in each train two of said gear members in each train being loosely and rotatably mounted on said cage member; and resilient means carried by said cage member urging one of said friction gear members in each train into rolling frictional contact with the second of said friction gear members in that train through a force applied in a plane substantially normal to the axes of rotation of said friction gear members, said second friction gear member in turn being urged into rolling frictional contact with the third friction gear member in that train so as to have a component of force applied to said third friction gear member in a radial direction relative to said cage member.

9. In a planetary friction gear drive, a planetary assembly of the form defined in claim 8 further characterized in that said first mentioned friction gear members in each train are each urged to move in substantially opposite directions, respectively.

10. A planetary frictional drive mechanism comprising: a cage member having an axial opening adapted to rotatably receive a drive shaft; two trains of at least two rolling members in frictional contact, each member being rotatably mounted on said cage member and said trains being disposed in spaced relation to each other; resilient means carried by said cage member normally urging one of said rolling members toward another of said rolling members in each train by a force applied in a plane substantially normal to the axes of rotation of said rolling members so that the periphery of the former projects beyond one of the peripheries of said cage member, the latter of said rolling members in each train being disposed so that its periphery projects beyond the other periphery of said cage member when so urged by the former of said rolling members; a first housing for said cage member encompassing that portion of the outer periphery of said cage member in which one of said trains is disposed so that at least one of said rolling members in said train is in rolling frictional contact with the interior of said housing; a second housing for said cage member encompassing that portion of the outer periphery of said cage member in which another of said trains is disposed so that at least one of said rolling members in said train is in rolling frictional contact with the interior of said housing; and a power output means operatively associated with said second housing member.

11. A planetary frictional drive mechanism of the character described in claim 10 in which the first housing is fixed relative to said cage member and the second housing is rotatably mounted relative to said cage member.

12. A planetary frictional drive mechanism of the character described in claim 10 in which the first housing is rotatably mounted relative to said cage member and adapted to be driven by a power source indepedent of said drive shaft, and in which said second housing is rotatably mounted relative to said cage member.

13. A planetary frictional drive mechanism of the character described in claim 10 in which said power output means is in the form of an output shaft.

14. A planetary frictional drive mechanism of the character described in claim 13 in which said output shaft is concentric to said drive shaft and is rotatable independently thereof.

15. A planetary frictional drive mechanism of the character described in claim 10 in which said power output means is in the form of a gear member mounted on an output shaft.

16. A planetary frictional drive mechanism of the character described in claim 10 in which the first housing is rotatably mounted relative to said cage member and adapted to be driven by a power source independent of said drive shaft, in which said second housing is rotatably mounted relative to said cage member, and in which said power output means is in the form of a gear member mounted on an output shaft.

17. A planetary frictional drive mechanism comprising: a cage member having an axial opening adapted to rotatably receive a drive shaft; two pairs of trains of at least two rolling members in motion transmitting frictional contact rotatably mounted on said cage member, with the axis of rotation thereof substantially parallel to the axis of said axial opening, each of said rolling members in each train being relatively loosely mounted so that its axis of rotation can be laterally shifted, said pairs of trains being mounted in spaced relation around said axial opening; a first housing for said cage member encompassing that portion of the outer periphery of said cage member in which a first pair of said trains is disposed; a second housing for said cage member encompassing that portion of the outer periphery of said cage member in which a second pair of said trains is disposed; first resilient means carried by said cage member normally urging one of the rolling members in each train of said first pair of trains toward a second rolling member in each train of said first pair of trains by a force applied in a plane substantially normal to the axes of rotation of said rolling members so that the periphery of at least one of the rolling members in each train in said first pair of trains projects outwardly beyond the outer periphery of said cage member into rolling frictional contact with the inner surface of said first housing and the periphery of at least one of the remaining rolling members in each train of said first pair of trains projects into the axial opening of said cage member so as to be disposed in rolling frictional contact with a drive shaft rotatably received therein; second resilient means carried by said cage member normally urging one of the rolling members in each train of said second pair of trains toward a second rolling member in each train of said second pair of trains by a force applied in a plane substantially normal to the axes of rotation of said rolling members so that the periphery of at least one of the rolling members in each train in said second pair of trains projects outwardly beyond the outer periphery of said cage member into rolling frictional contact with the inner surface of said second housing and the periphery of at least one of the remaining rolling members in each train of said second pair of trains projects into the axial opening of said cage member so as to be disposed in rolling frictional contact with a drive shaft rotatably received therein; and an output shaft operatively associated with said second housing member.

18. A planetary frictional drive mechanism comprising: a cage member having an axial opening adapted to rotatably receive a drive shaft; at least one train of at least two rolling members disposed in frictional contact and rotatably mounted on said cage member; a housing for said cage member encompassing the outer periphery of said cage member; resilient means carried by said cage member normally urging one of said rolling members toward another of said rolling members by a force applied in a plane substantially normal to the axis of rotation of said rolling member so that the periphery of at least one of said rolling members projects beyond one of the peripheries of said cage member and so that the periphery of at least one other of said rolling members projects beyond the other periphery of said cage member, at least one of said rolling members being disposed in rolling frictional contact with the interior of said housing and at least one of said rolling members being disposed in rolling frictional contact with said drive shaft when the latter is rotatably received in the axial opening of said cage member; a first output shaft operatively connected to said cage member; a second cage member having an axial opening adapted to receive said first output shaft and being rotatably mounted on the latter; at least one train of at least two additional rolling members disposed in frictional contact and rotatably mounted on said second cage member; a housing for said second cage member encompassing the outer periphery of said second cage member; resilient means carried by said cage member normally urging one of said additional rolling members toward another of said additional rolling members by a force applied in a plane substantially normal to the axis of rotation of said rolling member so that the periphery of at least one of said additional rolling members projects beyond one of the peripheries of said second cage member and so that the periphery of at least one other of said additional rolling members projects beyond the other periphery of said second cage member, at least one of said additional rolling members being disposed in rolling frictional contact with the interior of said housing and at least one of said additional rolling members being disposed in rolling frictional contact with said first output shaft when the latter is rotatably received in the axial opening of said second cage member; and a second output shaft operatively connected to said second cage member.

19. A planetary frictional drive mechanism of the form defined in claim 18 further characterized in that rotation of a drive shaft when received in said axial opening of said first named cage member causes the latter to rotate relative to said housing.

20. A planetary friction gear drive comprising: a drive shaft; a driven cage member rotatably mounted with respect to said drive shaft; a pair of rollers rotatably mounted on said cage member in rolling frictional contact with said drive shaft; a rolling motion transmitting element; an annular member the inner surface of which is in rolling frictional contact with said motion transmitting element; means carried by said cage member resiliently urging said rollers into rolling frictional contact with said rolling motion transmitting element by a force applied in a plane substantially normal to the axes of rotation of said rollers so that said cage member will rotate in a direction opposite to the direction of rotation of said drive shaft when said annular member is held stationary; and a power output means operatively connected to said cage member.

21. A planetary friction gear drive of the form defined in claim 20 further characterized in that the effective inner diameter of said annular member is adjustable.

22. A planetary friction gear drive comprising: a drive shaft; a driven cage member rotatably mounted with respect to said drive shaft; a roller rotatably mounted on said cage member in rolling frictional contact with said drive shaft; a rolling motion transmitting element; an annular member the inner surface of which is in rolling frictional contact with said motion transmitting element; means carried by said cage member resiliently urging said roller into rolling frictional contact with said rolling motion transmitting element by a force applied in a plane substantially normal to the axis of rotation of said roller so that said cage member will rotate in a direction opposite to the direction of rotation of said drive shaft when said anular member is held stationary; and a power output means operatively connected to said cage member.

23. In a planetary frictional drive mechanism having a housing with a cylindrical interior surface, a cage assembly encompassed by said housing comprising: an annular cage member having a central opening adapted to rotatably receive a drive shaft; a power output means operatively connected to said cage member; a train of at least three friction gear members two of which are loosely and rotatably mounted on said cage member, with the axes of rotation of said friction gear members disposed in at least two planes, the periphery of at least one of said members normally projecting outwardly beyond the outer periphery of said cage and the periphery of at least one other of said members normally projecting inwardly into said central opening; and resilient means carried by said cage member normally urging said members into such positions through a force applied in a plane substantially normal to the axes of rotation of said friction gear members.

24. A planetary frictional drive mechanism comprising: a cage member having an axial opening adapted to rotatably receive a drive shaft; a pair of trains of at least two rolling members disposed in frictional contact and rotatably mounted on said cage member; a power output means operatively connected to said cage member; resilient means carried by said cage member normally urging one of said rolling members toward another of said rolling members in each train by a force applied in a plane substantially normal to the axis of rotation of the latter member so that said rolling members in each train that are resiliently urged toward the other member are each urged in substantially opposite directions, respectively, relative to the direction of rotation of said cage member and so that at least one of said rolling members is urged to project beyond one of the peripheries of said cage member and at least one other of said rolling members in each train is disposed so that when the former member is so urged, the other of said rolling members is urged to project beyond the other periphery of said cage member; and a housing for said cage member encompassing the outer periphery of said cage member so that at least one of said rolling members in each train is in rolling frictional contact with the interior of said housing.

References Cited in the file of this patent

UNITED STATES PATENTS

| | | |
|---|---|---|
| 1,117,446 | Rodefeld | Nov. 17, 1914 |
| 1,298,560 | Poppink | Mar. 25, 1919 |
| 1,399,442 | Rennerfeldt | Dec. 6, 1921 |
| 2,703,992 | Hine et al. | Mar. 15, 1955 |
| 2,858,706 | Alexandersson | Nov. 4, 1958 |

FOREIGN PATENTS

| | | |
|---|---|---|
| 417,279 | Great Britain | Oct. 2, 1934 |